United States Patent Office 3,477,296
Patented Nov. 11, 1969

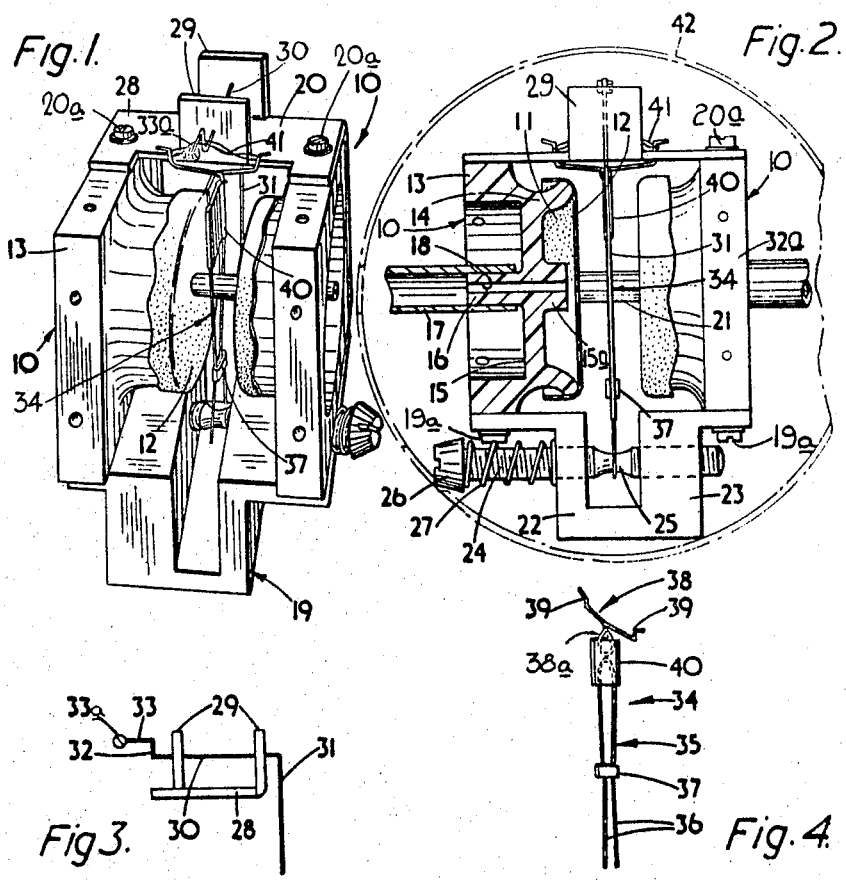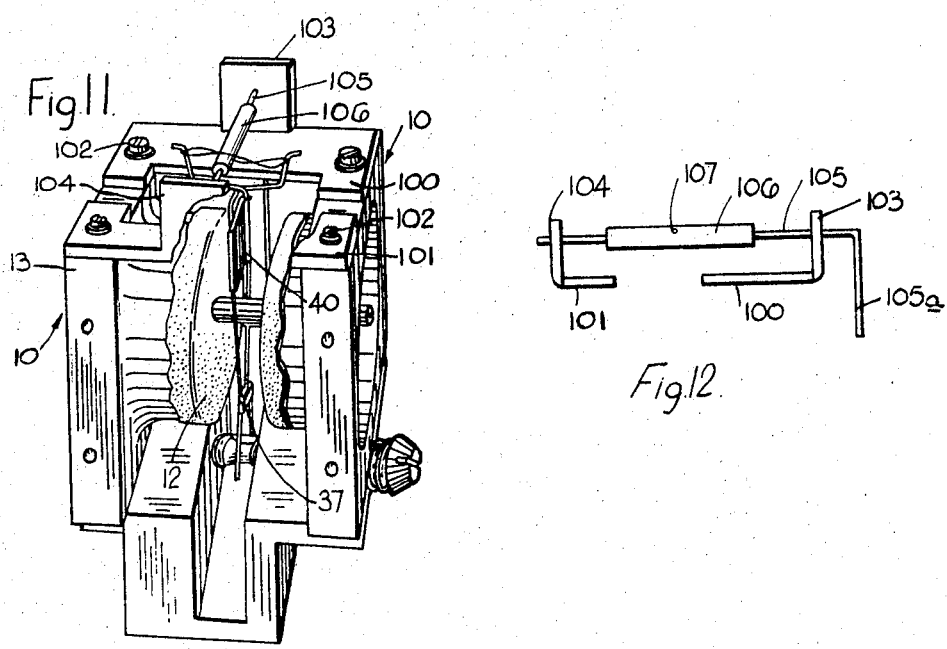

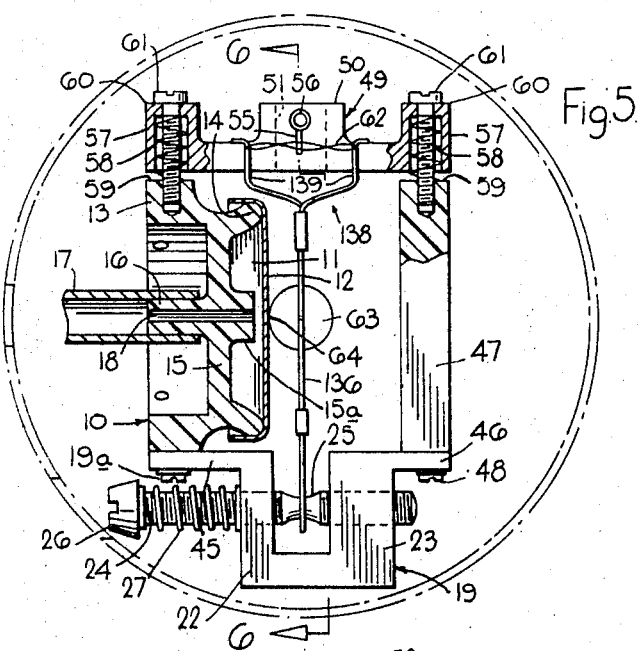
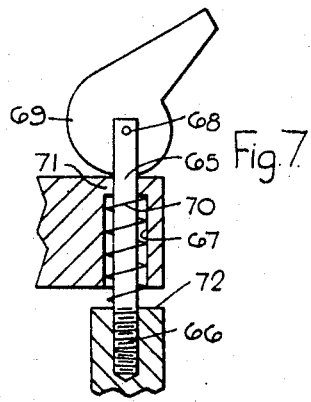
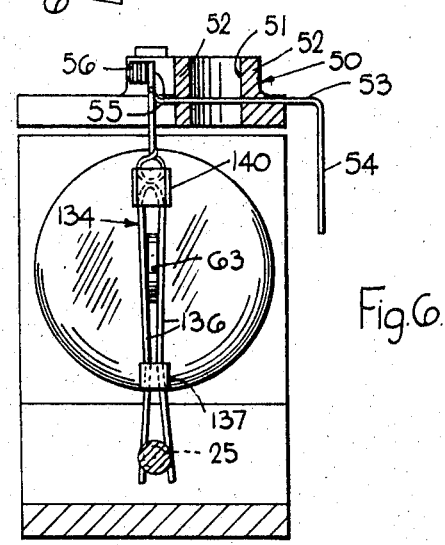
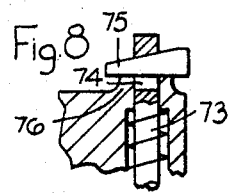
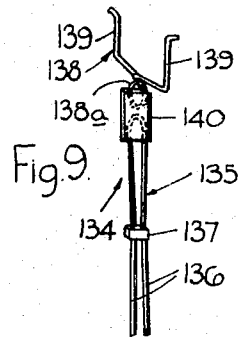
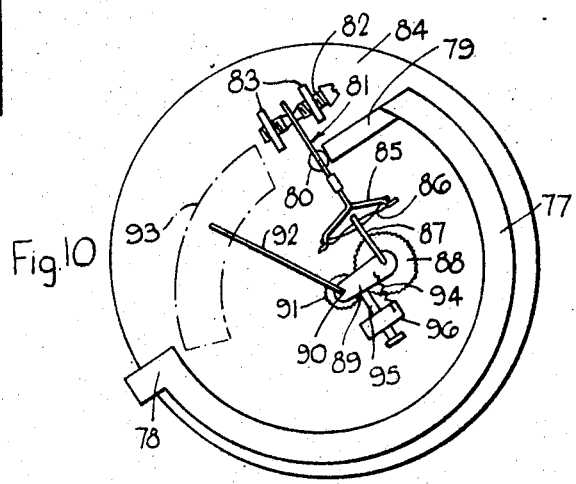

3,477,296
INSTRUMENTS
Norman Horwood, Moseley, and Alexander Gray, Greenock, England, assignors to Gray Horwood Engineering Limited, Edgbaston, Birmingham, Warwickshire, England, a British company
Filed Aug. 28, 1967, Ser. No. 663,825
Claims priority, application Great Britain, July 21, 1967, 33,617/67
Int. Cl. G01l 7/08, 7/04
U.S. Cl. 73—406     15 Claims

ABSTRACT OF THE DISCLOSURE

Transmission mechanisms particularly for instruments such as pressure gauges or other instruments having pointers, in which the spindle driving the pointer has a crank which is connected through a filament with a U-shaped yoke which moves generally in its own plane under the influence of the operative part of the instrument to rock the crank and thus the spindle. Variations use a roller instead of the crank and also means for varying the rate of the transmission mechanism. Unidirectional and differential pressure gauges employ the transmission mechanism.

BACKGROUND OF THE INVENTION

Field of the invention

The invention is concerned with transmission mechanism, particularly for instruments, for transmitting the movement of the operative part of the instrument to a spindle. The invention is also concerned with instruments employing such a transmission mechanism.

Description of the prior art

Heretofore, in the majority of instruments, of the indicating or sensing type, transmission mechanism in the form of a rack and pinion or other gear wheel mechanism has been employed. This prior transmission mechanism has been subject to two disadvantages. Firstly there is an appreciable amount of friction between the various gear wheels, or between the rack and pinion and this is reflected in the accuracy and consistency of the instrument. Secondly, the gear mechanism are subject to wear in use and after a considerable period of use the wear may be sufficient to adversely affect the accuracy of the instrument due to lost motion.

SUMMARY OF THE INVENTION

The invention provides a transmission mechanism, particularly for instruments, comprising a spindle held in bearing means for pivotal movement about an axis, a U-shaped yoke mounted for generally linear movement substantially in the plane of the limbs thereof and a filament extending between the limbs of the yoke and engaged with the spindle which is arranged between the limbs so that such movement of the yoke causes pivoting of the spindle.

Preferably there is a crank connected to the spindle to which the filament is connected.

Since the yoke is connected to the spindle only through a filament, there are no frictional forces between the yoke and the spindle tending to reduce the sensitivity of the transmission. Normally the yoke will be the driving member and the spindle will be the driven member, however the arrangement could be reversed if desired.

Preferably the transmission mechanism includes adjustment means for said bearing means whereby the distance between said axis and the point of engagement between the filament and the crank can be varied to vary the rate of the mechanism. By "rate of the mechanism" we mean the ratio between the movement of the yoke and the resulting movement of the spindle measured in any convenient manner. Thus, taking for example 1° movement of the spindle, in a mechanism having a higher rate this movement will be provided with less movement of the yoke than in a mechanism having a lower rate.

The transmission with the adjustment means is particularly useful in connection with unidirectional pressure gauges, i.e. gauges designed to indicate a pressure, where it is very desirable to be able to change the rate of the gauge so that a single form of construction can be used to measure different ranges of pressures by variation of the rate. The adjustment means is also useful when the transmission mechanism is applied to a differential pressure gauge, i.e. a gauge designed to indicate the equality or inequality of two pressures, so as to be able to adjust the position of the bearing means.

BRIEF DESCRIPTION OF THE DRAWINGS

Several embodiments of the invention will now be described in detail with reference to the acompanying drawings which show the working parts of such embodiments and in which:

FIGURE 1 is a perspective view of the working parts of a differential pressure gauge constituting a first embodiment of the invention;

FIGURE 2 is a side elevation of the working parts of FIGURE 1 partly broken away;

FIGURE 3 is a detail elevation showing the mounting of the spindle in FIGURES 1 and 2;

FIGURE 4 is a detail perspective view of the actuating arm of the gauge of FIGURES 1 to 3.

FIGURE 5 is a side elevation, partly broken away, of the working parts of a unidirectional gauge constituting a second embodiment of the invention;

FIGURE 6 is a section on the line 6—6 of FIGURE 5;

FIGURES 7 and 8 show alternative positioning means applicable to the gauge of FIGURES 5 and 6;

FIGURE 9 is a perspective view of part of the movement transmitting means shown in FIGURES 5, 6 and 10;

FIGURE 10 is an elevation of a unidirectional pressure gauge constituting a third embodiment of the invention;

FIGURE 11 is a perspective view of the working parts of the differential pressure gauge constituting a fourth embodiment of the invention; and FIGURE 12 is a detail elevation showing the mounting of the spindle in FIGURE 11.

DESCRIPTION OF THE PREFERRED EMBODIMENTS

Referring now to FIGURES 1 to 4, the working parts of the differential pressure gauge there shown comprise two members 10 each of which is similar and each of which provides a chamber 11 closed by a diaphragm 12. Each member has a square end portion 13 and a generally cylindrical end portion 14. The diaphragm 12 is cemented across the end of the cylindrical end portion and is made of thin latex. A transverse wall 15 extends across each member and is inset from both ends thereof. Extending from the centre of the wall 15 towards the end portion 13 is a tubular projection 16 which is arranged to receive a pipe 17, the bore 18 of the projection 16 communicating with the chamber 11 formed between the transverse wall 15 and the diaphragm 12 through a boss 15a which limits movement of the diaphragm and serves, when engaged by the diaphragm, to cut off the chamber 11 from the pipe 17.

The two members 10 are mounted in alignment by means of two brackets 19 and 20 which are screwed by screws 19a and 20a to opposite flats of the square end portions 13. The members 10 are aligned with the diaphragms 12 in aligned face to face relation and separated by a short distance. The diaphragms are rigidly connected together at their centres by a short solid rubber rod 21 which is cemented at its ends to the confronting faces of the diaphragms.

The bracket 19 is generally U-shaped and extending between the limbs 22 and 23 of the U is a threaded pin 24 which passes through a clearance hole in the limb 22 and is received in an internally threaded hole in the limb 23. Generally centrally of the pin there is a peripheral groove 25 forming a notch and which acts as a fulcrum as will hereinafter be described. The pin is provided with an enlarged head 26 and a compression spring 27 is inserted between the head 26 and the limb 22 so that the pin may be adjusted in position and will be held in its adjusted position by the spring 27.

The bracket 20 has a plate-like portion 28, the ends of which are connected to the members 10 by the screws 20a, and between its ends the bracket has two upwardly projecting portions 29 which are drilled to provide bearings for a spindle 30. The spindle lies in a vertical plane which is generally perpendicular to the vertical plane containing the longitudinal axis of the rubber rod 21 joining the diaphragms and is formed in one piece with a pointer 31 which is at right angles to the spindle and is arranged to traverse over a dial plate (not shown) fixed to a pair of third flats, one of which is shown at 32a of the members 10. The end of the spindle 30 remote from the pointer 31 is bent to form a crank 32 which is perpendicular to the spindle and a further portion 33 extends from the end of the crank and lies parallel with the rotational axis of the spindle but offset therefrom. This further part carries a counterweight 33a in the form of a small nut and bolt fixed in a loop in said portion.

The diaphragms 12 are connected to the spindle by means of an arm 34 consisting of two pieces of spring wire. The first piece of wire 35 (see FIGURE 4) is of generally hairpin shape and the limbs 36 thereof embrace the rubber rod 21 between the two diaphragms. The free ends of the limbs 36 engage in the groove 25 in the pin 24 and are retained in engagement with the groove and with the rod 21 by means of a rubber sleeve 37 which embraces the limbs 36.

The other piece 38 of spring wire is formed into a generally U-shaped yoke having limbs 39 which lie in a plane perpendicular to the plane containing the limbs 36. The base of the U-shaped yoke is provided with a loop 38a and this, together with the closed end of the hairpin piece 35, is received in a metal tube 40 which is flattened and dimpled to retain the members connected together.

The vertical plane containing the limbs 39 of the U-shaped yoke also contains the crank 32 on the spindle and a filament 41 extends between the limbs 39 of the yoke and is engaged with the crank. The filament is in the form of a loop of nylon thread which is twisted and the crank 32 is engaged between two adjacent twists of the filament and is arranged so that there is an equal number of twists on each side thereof.

The arrangement is such that if there is a difference between the pressures in the two chambers 11, the rubber rod 21 will move longitudinally and will thus cause the arm 34 to pivot about the fulcrum provided by the groove 25 in the pin 24. The U-shaped yoke will thus move linearly in an arc in the plane of its limbs 39 and will cause the spindle to pivot. The counterweight 33a is provided so that the pointer will remain in substantially he same zero position irrespective of the position of the gauge.

In a modified construction, not illustrated, the two-diaphragm diaphram-assembly shown in the drawings may be replaced by a single flexible diaphragm. In this case, an arm will be provided which extends radially from the periphery of the single diaphragm and is embedded in the material thereof. The projecting end of the arm will have a U-shaped yoke similar to that of the arm 34 described in relation to the drawings. The inner end of the arm will be embedded in the material of the diaphragm and will lie adjacent the centre of the diaphragm. It will not be possible in this construction, therefore, to adjust the zero position by adjusting the other end of the arm. The diaphragm may be made of a single piece of material or of two pieces of material adhered together with the arm sandwiched between them.

A differential pressure gauge embodying the invention may be incorporated into carburettor balancing equipment having means whereby each of the chambers closed by the diaphragm can be connected to the inlet of one of two carburettors and so that the gauge will indicate the degree of balance or imbalance between the depressions at the inlets to the carburettors.

Referring now to FIGURES 5, 6 and 9, the pressure gauge there shown is a unidirectional pressure gauge which is in many respect similar to the differential pressure gauge shown in FIGURES 1 to 4. The gauge has only a single diaphragm 12, however, which is mounted as in the gauge of FIGURES 1 to 4. The same reference numerals are used in FIGURES 5, 6 and 9 to indicate parts which are identical to those shown in FIGURES 1 to 4. Thus referring to FIGURES 5, 6 and 9 the gauge there shown comprises a member 10 providing a chamber 11 closed by a diaphragm 12, the member has a square end portion 13 and a generally cylindrical end portion 14. The diaphragm 12 is cemented across the end of the cylindrical end portion and is made of thin latex. A transverse wall 15 extends across the member 10 and is inset from both ends thereof. Extending from the centre of the wall 15 towards the end portion 13 is a tubular projection 16 which is arranged to receive a pipe 17, the bore 18 of the projection 16 communicating with the chamber 11 through a boss 15a which limits movement of the diaphragm, and serves, when engaged by the diaphragm, to cut off the chamber 11 from the pipe 17.

The member 10 is mounted on a bracket 19 by means of screws, one of which is shown at 19a, received in the square end portion 13 of the member. The bracket is generally U-shaped and has limbs 22 and 23 which receive a threaded pin 24. The pin passes through a clearance hole in the limb 22 but is threadedly engaged in a threaded hole in the limb 23. The pin has a peripheral notch 25 which is located between the limbs 22 and 23 and which acts as a fulcrum as described above. The pin is provided with an enlarged head 26 and a compression spring 27 is located between the head 26 and the limb 22 so that the pin may be adjusted in position and will be held in its adjusted position by the spring 27.

The member 10 is secured to a flange 45 of the bracket 19 and there is an opposite flange 46 to which a plate 47 is secured by screws 48. The plate 47 is square and is identical in the size and shape to the end portion 13 of the member 10.

Mounted on the member 10 and the plate 47 is bearing means indicated generally at 49. The bearing means comprise a block of synthetic resinous material which is formed with a boss 50 which is drilled to provide a bore 51 so as to provide, as shown in FIGURE 6, two portions 52 which are spaced apart and which are themselves drilled to provide bearings for a spindle 53. The spindle has an integral extension at one end which forms a pointer 54 and at its other end has an integral extension which provides a crank 55 and a balance weight 56 which is in the form of a coil. The bearing means 49 is also provided with two further bosses 57 each of which contains a compression spring 58 which is located between an upper surface 59 of the member 13 or 47 and an upper wall 60 of the boss. The springs 58, therefore, tend to lift the bearing means 49 away from the member 10 and the plate 47. Two screws 61 are provided, each passing through an associated spring 58 and being engaged in a bore in the member 10 or the plate 47. It will be seen that by adjusting the screws 61, the bearing means 49 can be moved vertically relative to the member 10 and the plate 47 so as to vary the position of the spindle 53.

The spindle 53 is rotated via the crank 55 by means of an arm 134 shown in FIGURE 9 and which is identical to the arm 34 in FIGURE 4 except that the yoke has larger limbs indicated at 139. The parts of the arm in FIGURE 9 which are similar to the arm 34 in FIGURE 4 are shown by the same reference numerals with the prefix of 1. A filament 62, conveniently of nylon thread, extends between the limbs 139 and the crank 55 is engaged between two adjacent twists of the filament and is arranged so that there is an equal number of twists of the filament on each side thereof.

The limbs 139 of the yoke lie in the plane of the paper in FIGURE 5 and movement of the yoke in this plane will cause pivoting of the spindle through the crank 55 as explained above. The limbs 136 lie in a common plane which is at right angles to the plane in which the limbs 139 lie; that is to say the limbs 136 lie in the plane of the paper in FIGURE 6.

Interposed between the limbs 136, as clearly shown in FIGURES 5 and 6, is a disc-like element 63 the ends of which are gripped by the limbs 136. The disc-like element is adhered at 64 to the diaphragm 12. The disc-like element 63 has a convex surface and therefore makes line contact with the diaphragm 12 and it is along this line that adhesion is effected.

As shown in FIGURES 5 and 6, the lower ends of the limbs 136 engage in the notch 25 in the pin 24 and which provides a fulcrum.

The operation of the gauge will, it is believed be substantially self evident from the foregoing. Briefly, however, gas under pressure introduced into the chamber 11 through the pipe 17 will move the diaphragm 12. Movement of the diaphragm will be transmitted by the element 63 to the arm 134 and the arm will then rock about the fulcrum provided by the notch 25. This rocking movement is transmitted into arcuate linear movement of the yoke 138 and this linear movement rocks the crank 55 which turns the spindle 53.

It will be appreciated that the rate of the gauge, as defined above, may be varied by varying the distance between the spindle 53 and the connection between the crank 55 and the filament 62. The further away the spindle is from said connection the less will the movement of the diaphragm be magnified and vice versa. By this means, therefore, it is possible to use gauges of the same general construction for measuring different ranges of pressure merely by adjusting the position of the bearing means 49. It will be appreciated that the bearing means 49 will remain in the position to which it is adjusted by operation of the screws 61 by virtue of the springs 58 acting against the screws 61.

Bearing means 49 similar to that shown in FIGURES 5 and 6 may also be applied to differential pressure gauges of the construction shown in the FIGURES 1 to 4 although the pivotally mounted element 63 is not applicable to differential pressure gauges. The advantage of having adjustably mounted bearing means such as 49 in differential pressure gauges is that the gauges can easily be adjusted for different ranges of sensitivity.

FIGURE 7 shows an arrangement which is an alternative to the screws 61 in FIGURES 5 and 6. In FIGURE 7, a pin 65 has its lower end 66 threadedly engaged either in the member 10 or the plate 47 and passes through a bore 67 in the bearing means. Pivoted at 68 at the upper end of the pin is a cam 69 and a spring 70 is located between a wall 71 at the upper end of the bore and the supper surface 72 of the plate 47 or member 10. The bearing means can thus be adjusted in position by varying the settings of the cams 69. It will be appreciated that there are two cams 69 corresponding to the scrwes 61 in FIGURES 5 and 6.

In FIGURE 8 is shown an arrangement in which pins 73 are used which are mounted similarly to the pins 65 and are apertured at 74 to receive wedges 75 which engage bosses 76 of the bearing means which are adjusted by moving the wedges.

FIGURE 10 shows a unidirectional pressure gauge using a Bourdon tube. Thus referring to FIGURE 10, the Bourdon tube is indicated at 77 and is anchored at one end 78 which provides an inlet for gas under pressure. At its other end the tube is provided with an abutment 79 to which is hingedly mounted a disc-like element 80 similar to the element 63 in FIGURES 5 and 6. The element engages an arm 81 which is identical to the arm 134 in FIGURE 9 and the lower end of the arm 81 engages a fulcrum screw 82 which is mounted in brackets 83 on the base plate 84 of the gauge in a manner similar to the mounting of the screw 24 in FIGURES 5 and 6. The arm 81 carries a yoke 85 at its upper end which is identical to the yoke 138 and a filament 86 extends between the ends of the yoke and engages a crank 87. This crank 87 is connected to a first pinion 88 which is mounted on an arm 89 which is pivotable about a fixed axis 90 about which is also pivotable a second pinion 91. The pinion 91 carries a pointer 92 which moves over a scale 93. The free end of the pointer is broadened to provide a counterweight as is normal practice in a Bourdon tube gauge.

The arm 89 is acted upon by a spring 94 which urges it in a clockwise direction and the movement of the arm is limited by means of a screw 95 which is mounted in a block 96 on the base plate 84 of the gauge.

It will be seen that as the tube 77 tends to straighten when gas under pressure is applied thereto, the arm 81 will be rocked about its fulcrum pin 82 so that the yoke 85 will move and will pivot the crank 87 thus rotating the pinion 88, the pinion 91 and the pointer 92. The rate of the gauge can be adjusted by means of the screw 95 since it is possible to adjust the distance between the spindle on which the pinion 88 is mounted and the connection between the crank 87 and the filament 86. This simple adjustment eliminates the need for hand bending of the Bourdon tube connection links in such gauges which at present takes place.

FIGURES 11 and 12 show a differential pressure gauge constituting a fourth embodiment of the invention and which is similar to the gauge shown in FIGURES 1 to 4 but wherein the crank 32 which is provided on the spindle in the above described construction is replaced by a roller.

Parts of the gauge shown in FIGURES 11 and 12 which are identical to parts of the gauge shown in FIGURES 1 to 4 have the same reference numerals. The difference between the two gauges is in the mounting and construction of the spindle as will now be described. In place of the bracket 20 of the gauge of FIGURES 1 to 4, there are two similar brackets 100 and 101 which are generally U-shaped in plan view and which have their limbs secured to the upper surfaces of the members 10 by screws, two of which are indicated at 102. Each bracket has an upwardly projecting portion 103 and 104 respectively and in the projecting portions is rotatably mounted a spindle 105. The spindle is in one piece with a pointer 105a. The spindle 105 carries a roller 106 which is drilled at 107 and a filament is passed through the drilling 107 and is wrapped around the roller 106 and has its ends engaged with the limbs 39 of the yoke member 38 as described in FIGURE 4.

It will be seen that as the rod 21 moves with the diaphragms 12, the resulting linear movement of the yoke member 38 would cause rotation of the roller 106 and thus of the spindle 105 and resulting movement of the pointer 105a.

It will be seen that the invention provides both transmission mechanism and unidirectional and differential pressure gauges incorporating such transmission mechanism.

What is claimed is:

1. A transmission mechanism comprising a spindle, a crank connected with the spindle, spaced bearing means for pivotally mounting said spindle for movement about its longitudinal axis, a U-shaped yoke having limbs on either side of said spindle, means to mount said yoke for generally linear movement substantially in the plane of the limbs thereof and a filament extending between the limbs of the yoke and engaged with the crank so that such movement of the yoke causes pivoting of the spindle.

2. A transmission mechanism according to claim 1 wherein the filament is in the form of a twisted loop, the crank being arranged within the loop between two twists thereof.

3. A transmission mechanism according to claim 2 forming part of an instrument having a pointer, the pointer being connected with the spindle.

4. A transmission mechanism according to claim 3 wherein the crank is connected to a portion extending parallel to the axis and offset therefrom, said portion carrying a counterweight to counterbalance the movement of the pointer about the spindle axis.

5. A combination of a transmission mechanism according to claim 2 with means movable in response to pressure and including an element hingedly mounted on the movable means, the element having a convex surface and being adhered to the movable means along a line in said surface, said line adhesion constituting the hinge, said element being connected to said yoke to move the same in response to said pressure.

6. A combination of a transmission mechanism according to claim 2 with means movable in response to pressure, the movable means comprising two diaphragms aligned in face to face relation and a coupling rigidly mechanically coupling the diaphragms at their centers, each diaphragm being arranged to be exposed to a different one of two different pressures and the coupling being connected to said yoke.

7. A combination of a transmission mechanism according to claim 2 with a diaphragm movable in response to pressure and an arm fixed to move with and projecting from the diaphragm and connected to said yoke.

8. A transmission mechanism, particularly for instruments, comprising a spindle held in bearing means for pivotal movement about an axis, a U-shaped yoke mounted for generally linear movement substantially in the plane of the limbs thereof, a filament extending between the limbs of the yoke and engaged with the spindle which is arranged between the limbs so that such movement of the yoke causes pivoting of the spindle and adjustment means for said bearing means for varying the distance between said axis and the point of engagement between the filament and the crank to vary the rate of the mechanism.

9. A transmission mechanism acocrding to claim 8 wherein the adjustment means includes resilient means urging said bearing means away from said point of engagement and positioning means for limiting movement of the bearing means under the influence of the resilient means.

10. A transmission mechanism according to claim 9 wherein the positioning means comprise a plurality of screw-threaded members mounted on a fixed part and engaging said bearing means.

11. A transmission mechanism according to claim 9 wherein the positioning means comprises rotatable cam means mounted on a fixed part and engaging the bearing means.

12. A transmission mechanism according to claim 9 wherein the positioning means comprises slidable wedge means interposed between a fixed part and the bearing means.

13. The combination of a transmission mechanism according to claim 6 with means movable in response to pressure, the last said means being connected to said yoke to move the same in response to said pressure.

14. A transmission mechanism, particularly for instruments, comprising a spindle held in bearing means for pivotal movement about an axis, an arm having a U-shaped yoke at one end and engaging a fulcrum at the other end, said other end of the arm being bifurcated and engaging in a notch in an adjustably mounted elongated member which provides the fulcrum, said yoke being mounted for generally linear movement substantially in the plane of the limbs thereof and a filament extending between the limbs of the yoke and engaged with a spindle which is arranged between the limbs so that such movement of the yoke causes pivoting of the spindle.

15. The combination of a transmission mechanism according to claim 12 with means movable in response to pressure, the last said means being connected to said yoke to move the same in response to said pressure.

References Cited

UNITED STATES PATENTS

| | | | |
|---|---|---|---|
| 187,052 | 2/1877 | Seybold. | |
| 2,447,739 | 8/1948 | Courtney | 73—411 |
| 1,263,404 | 4/1918 | Green | 74—89.2 |
| 1,331,307 | 2/1920 | Woods | 74—89.2 |

LOUIS R. PRINCE, Primary Examiner
DENIS E. CORR, Assistant Examiner

U.S. Cl. X.R.

73—407, 411